United States Patent [19]

Takano

[11] Patent Number: 5,758,185

[45] Date of Patent: May 26, 1998

[54] METHOD FOR RESETTING A SYSTEM CONTROLLED BY A CPU AND HAVING A SEMI-AUTONOMOUS IC UNIT

[75] Inventor: Toshiya Takano, Hokkaido, Japan

[73] Assignee: Hudson Soft Co. Ltd., Hokkaido, Japan

[21] Appl. No.: 392,608

[22] Filed: Feb. 22, 1995

Related U.S. Application Data

[63] Continuation-in-part of Ser. No. 100,933, Aug. 2, 1993, abandoned.

[30] Foreign Application Priority Data

Oct. 1, 1992 [JP] Japan .................. 4-284985

[51] Int. Cl.[6] ............................................. G06F 1/24
[52] U.S. Cl. ............................... 395/830; 395/651
[58] Field of Search ................................ 395/800, 750, 395/700, 830, 800.38, 651; 273/435, 434; 463/43

[56] References Cited

U.S. PATENT DOCUMENTS

| | | | |
|---|---|---|---|
| 4,589,090 | 5/1986 | Downing et al. | 395/575 |
| 5,070,450 | 12/1991 | Holman et al. | 395/750 |
| 5,291,494 | 3/1994 | Bruckert et al. | 371/11.3 |
| 5,297,287 | 3/1994 | Miyayama et al. | 395/700 |
| 5,388,841 | 2/1995 | San et al. | 273/435 |

*Primary Examiner*—Larry D. Donaghue
*Attorney, Agent, or Firm*—Laff, Whitesel, Conte & Saret, Ltd.

[57] ABSTRACT

In an information processing system including a CPU and peripheral IC apparatus, reset signals are supplied from the CPU to the peripheral IC apparatus, after the CPU is completely reset.

4 Claims, 4 Drawing Sheets

METHOD FOR RESETTING A SYSTEM CONTROLLED BY A CPU AND HAVING A SEMI-AUTONOMOUS IC UNIT

This is a continuation-in-part, of application Ser. No. 08/100.933, filed Aug. 8, 1993, now abandoned.

FIELD OF THE INVENTION

This invention relates to a method for resetting a system in an information processing apparatus.

BACKGROUND OF THE INVENTION

Considering a hardware structure in an information processing apparatus, a case where a CPU operates alone is seldom found. In an ordinary case, a CPU operates together with other IC apparatus having various functions. For this reason, reset signals are supplied to the CPU and the other IC apparatus simultaneously with an initialization of the entire hardware.

FIG. 1 shows a conventional method for resetting a system, wherein reset signals are supplied in parallel to a CPU and other IC apparatus. In the conventional method, a reset time is shorten, while the precision of the reset operation is lowered. In this reset operation, it is not known which one is first completed to be reset among the CPU and the other IC apparatus.

According to the conventional method, a whole system does not work properly, even if only one of the CPU and the other IC apparatus is not reset. Especially if the CPU is not reset, the system runs in a "violation manner" to result in an unexpected accident.

SUMMARY OF THE INVENTION

Accordingly, it is an object of the invention to provide a method for resetting a system if the violation-run of a CPU is caused by the non-resetting of the CPU.

According to the invention, a method for resetting a system, comprises the steps of:

supplying a CPU with a reset signal; and supplying IC apparatus with reset signals in parallel; after the CPU is completely reset, the system comprising the CPU and the IC apparatus are all reset.

In the invention, when a CPU receives a reset signal, the CPU starts resetting. When the resetting is completed in the CPU, the reset signals are supplied from the CPU to other IC apparatus, as shown in FIG. 2. That is, no reset signal is supplied to the other IC apparatus, before the CPU is completely reset.

BRIEF DESCRIPTION OF THE DRAWINGS

The invention will be explained in more detail in conjunction with appended drawings, wherein.

DESCRIPTION OF THE PREFERRED EMBODIMENT

Figure 1:
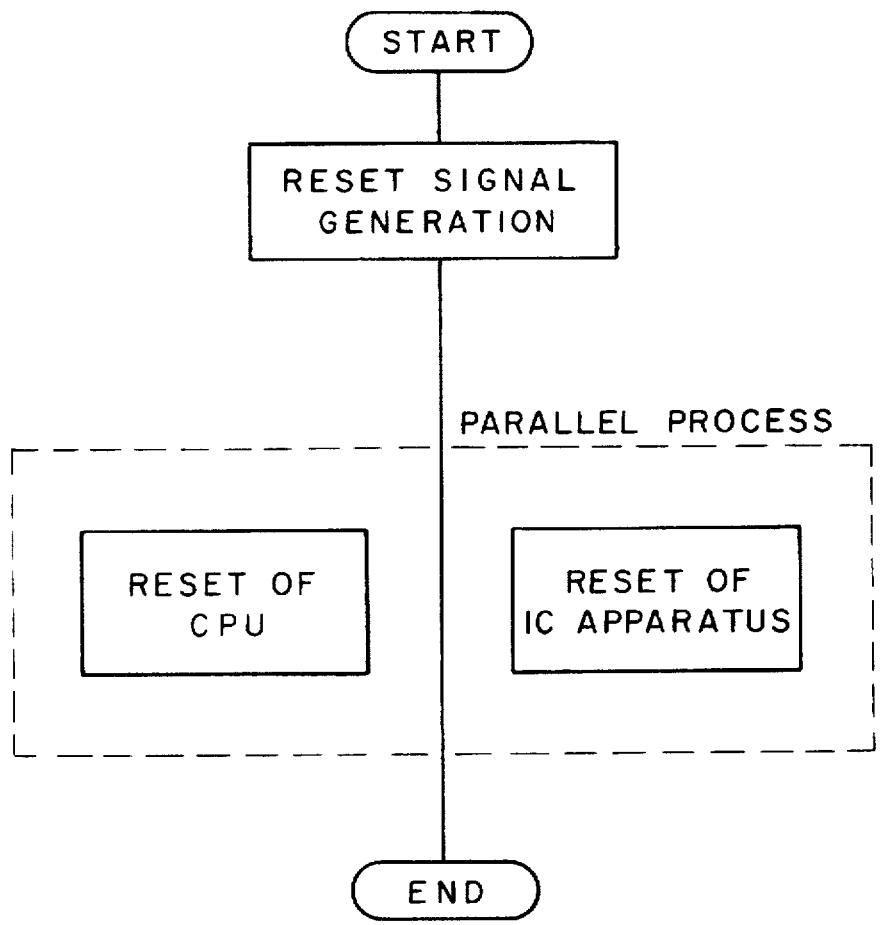
FIG. 1 is a flow chart of a conventional method for resetting a system.
Figure 2:
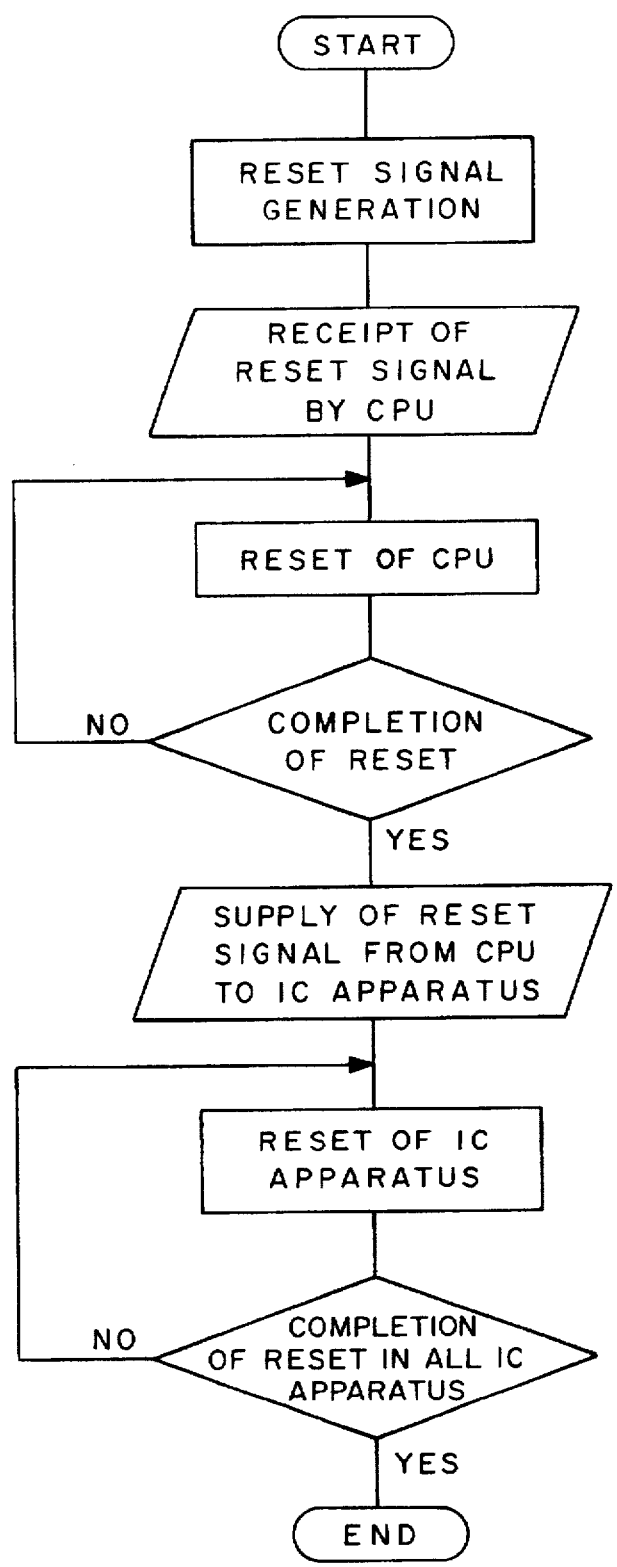
FIG. 2 is a flow chart of a method for resetting a system in a preferred embodiment according to the invention.
Figure 3:
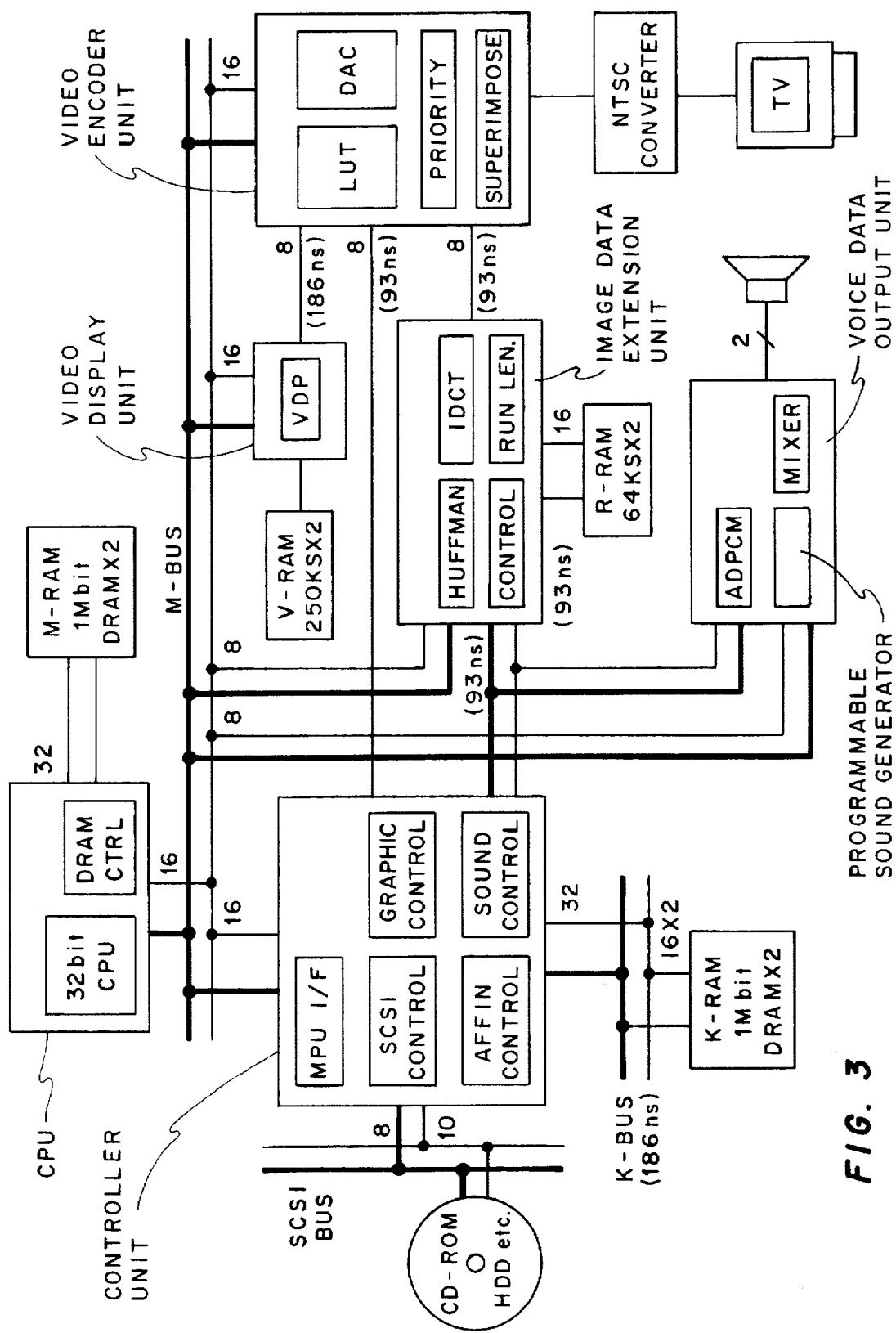
FIG. 3 is a block diagram showing a voice and image processing apparatus in the preferred embodiment.

FIG. 3 shows a voice (sound) and image processing apparatus in the preferred embodiment, wherein a CPU controls a plurality of IC apparatus represented by rectangle blocks.

This processing apparatus comprises a game soft storing medium, such as CD-ROM, etc., a CPU of 32 bits, a control unit for transfer-control of image and voice data and for interfacing each apparatus, an image data extension and transformation unit, an image data output unit, a voice data output unit, a video encoder unit, a video display unit, etc. Each unit is an IC apparatus, and has a memory such as K-RAM, M-RAM, R-RAM, V-RAM, etc.

The CPU has a memory control function for controlling the DRAM via a memory support, an I/O control function for communicating with various peripheral devices via I/O ports, and an interruption control function, and is provided with a timer, parallel input and output ports, etc.

The video display unit reads display-data written into the V-RAM by the CPU, and the read data is supplied to the video encoder unit to be displayed on the screen.

The controller unit has a built-in SCSI controller, into which image and voice data are supplied from an external memory apparatus such as the CD-ROM, etc. via a SCSI interface. The supplied data are once buffer stored in the K-RAM.

The priority of background image data for a natural picture is determined in the controller unit to be supplied to the video encoder unit by one dot data unit.

Data-compressed motion picture (full color, pallet) data is supplied to the image data extension unit. The image data extension unit extends the data, and the extended data is supplied to the video encoder unit.

The video encoder unit carries out the process such as super-impose, color pallet regeneration, special effect, D/A conversion, etc. on data of VDP image, natural picture background image, and motion picture (full color, pallet) supplied from the video display unit, the controller unit, and the image data extension unit, and image signals encoded to be NTSC signals by the NTSC converter are supplied to the screen.

ADPCM video data read from the CD-ROM, etc. is buffer stored in the K-RAM in the same manner as image data, and is supplied to the video data output unit to be reproduced therein by the controller unit.

If not controlled, there could be a glitch operation wherein one part of the circuit of FIG. 3 is reset and other parts are not simultaneously reset. The most likely problem would occur when an end of sound causes the voice data output unit to reset while the CPU is still running.

In FIG. 3, the voice data output unit includes the block "ADPCM", an acronym for Adaptive Differential Pulse Code Modulator. In the ADPCM, the voice data is determined in accordance with the addition or subtraction of a difference between the presently transmitted data and data which was transmitted during one preceding period.

Figure 4:
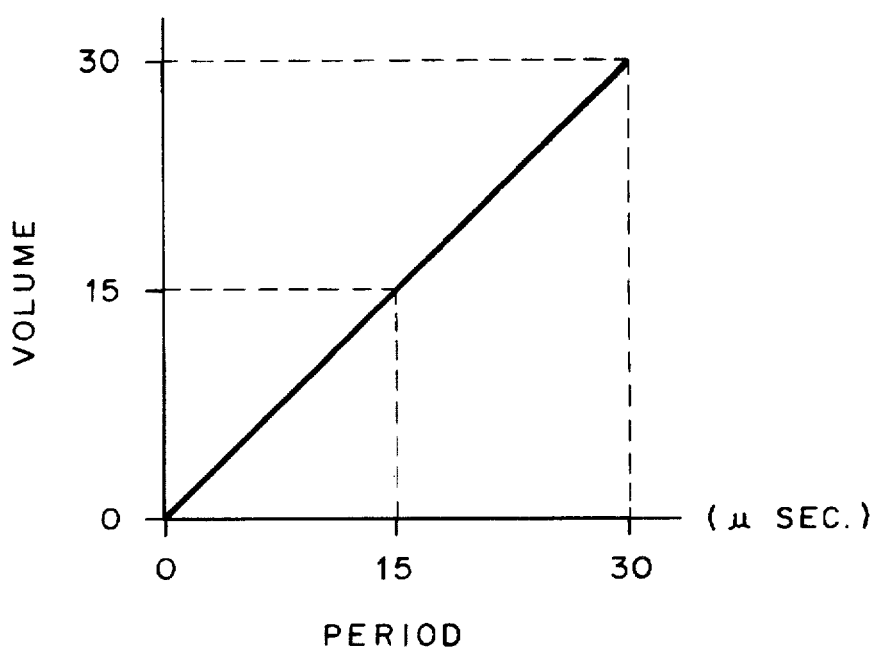
FIG. 4 is a graph which symbolically shows a CPU operating without reset.
Figure 5:
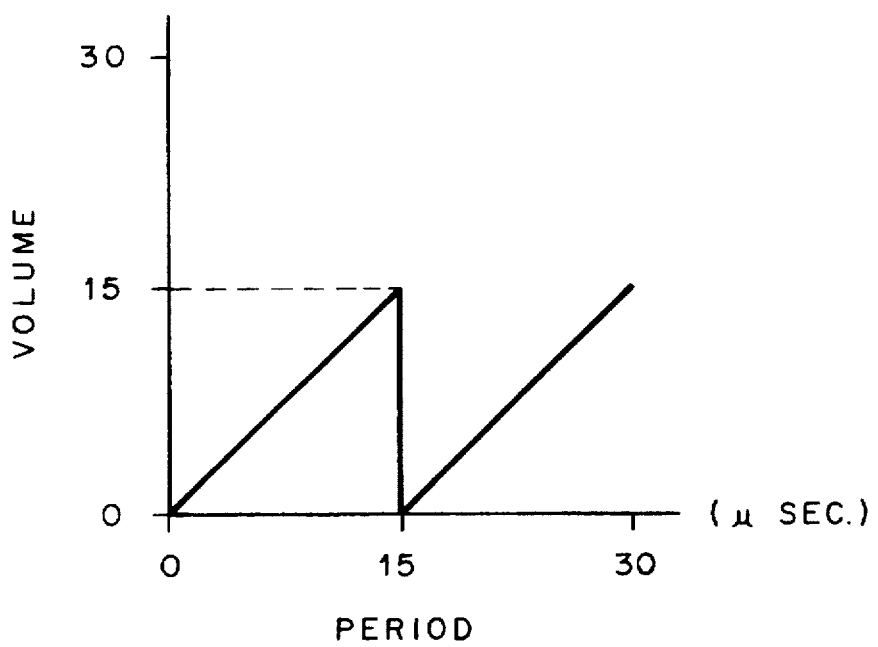
FIG. 5 is a graph which symbolically shows an IC resetting itself to illustrate how the CPU losses control over the system if an IC reset and a CPU does not reset.

Attached hereto are FIGS. 4 and 5, wherein data in the form of triangular information is transmitted from the CPU to the voice output unit, the figures being drawn to illustrate a condition such that sound generation starts at the origin "O" (an arbitrary unit), and that the sound generation increases by "one" during each 1 µ-second period, so that the volume "30" is obtained after thirty 1 µ-second periods have passed.

Here, it is assumed that, when the period is at fifteen μ-sec, the voice data output unit is reset, but the CPU is not reset. Such a disadvantageous state may occur in the conventional system. On the other hand, the invention avoids this problem of a failure of the CPU to reset when the voice signal ends.

In this state, FIG. 4 shows the sound data transmitted from the CPU which is not reset, but which continues operating. The sound data in the voice output unit, which is reset after the period of 15 μ-seconds (FIG. 5), continues. As a result, the CPU's transfer data (FIG. 4) and the voice output unit's output data (FIG. 5) become different. The invention avoids this disadvantage by resetting the CPU first, and only then the voice output unit.

In the processing apparatus as described above, if the CPU fails to be reset, and the other IC apparatus are reset, the voice data output unit operates independently, so that sound continues without any control. On the other hand, only when the CPU is reset, are reset signals supplied from the CPU to the other IC apparatus in the preferred embodiment, such a sequence of resets prevents a violation-run.

As described above, the possible violation-run of other IC apparatus caused by a no-control condition of a CPU never occurs in the invention. For this control, a precise resetting operation is carried out. Especially, the invention is very advantageous in an apparatus including a voice (sound) output unit which consumes an excessive amount of power due to the violation-run of a CPU.

Although the invention has been described with respect to specific embodiment for complete and clear disclosure, the appended claims are not to be thus limited but are to be construed as embodying all modification and alternative constructions that may occur to one skilled in the art which fairly fall within the basic teaching herein set forth.

What is claimed is:

1. A method of resetting a sound and image processing system comprising the steps of:

providing a source of program signals;

providing a central processing unit ("CPU") for controlling said system in response to said program signals;

providing a means for displaying a video image;

providing a means for outputting a sound;

providing a plurality of peripheral equipment integrated circuit units ("IC") interconnected by data buses for controlling said video display means and said sound output means under the control of said CPU and in response to said source of program signals, said peripheral equipment being selected from a group consisting of a controller, a control unit for transfer-control of image and voice data, an interfacing apparatus, image data extension and transformation units, an image data output unit, a voice data output unit, a video encoder unit, a video display unit, semi-autonomus IC units, and memory units;

resetting said system in a sequence which first resets said CPU and only then after the CPU reset is completely reset, said system resets said peripheral equipment, whereby there can not be an uncoordinated reset where an IC resets while the CPU continues issuing control signals.

2. The method of claim 1 and the added step of including an Adaptive Differential Pulse Code Modulator ("ADPCM") as an IC within the means for outputting sound, said ADPCM having at least some capability of managing said program signals independently of said CPU, whereby said ADPCM can not reset itself before the CPU is reset.

3. The method of claim 1 and the added step of supplying said program signals from an external soft storing medium.

4. The method of claim 3 wherein said program signals are video game signals and said soft storing medium is a CD-ROM.

* * * * *